L. WARGA.
CAR STEP.
APPLICATION FILED JULY 17, 1919.

1,334,980. Patented Mar. 30, 1920.

Witness:
Louis L. Korach

Inventor:
Louis Warga
By Marcus A. Kirschl,
Attorney

UNITED STATES PATENT OFFICE.

LOUIS WARGA, OF CHICAGO, ILLINOIS.

CAR-STEP.

1,334,980.　　　　Specification of Letters Patent.　　Patented Mar. 30, 1920.

Application filed July 17, 1919. Serial No. 311,509.

*To all whom it may concern:*

Be it known that I, LOUIS WARGA, a citizen of the United States, residing in Chicago, county of Cook, State of Illinois, have invented new and useful Improvements in Car-Steps, of which the following is a specification.

This invention relates in general to car-steps for use on railroad cars, and has for its principal object, the provision of a step or tread adapted to be attached to the steps of Pullman cars now in ordinary use which will take the place of the low stool heretofore used by the porters or attendants on such cars to furnish passengers with an additional step between the ground and the lowermost step on the car. In my improved device I have provided such a step or tread which ordinarily is up snugly beneath the lowest step on the car and which readily may be lowered into operative position when desired. My improved step is so designed that it may be made easily and cheaply, may be attached readily to car steps of standard construction and may be moved up out of the way beneath the lowest car step or lowered into operative position.

I have shown a step embodying the principles of my invention in the accompanying drawings in which.

Figure 1:
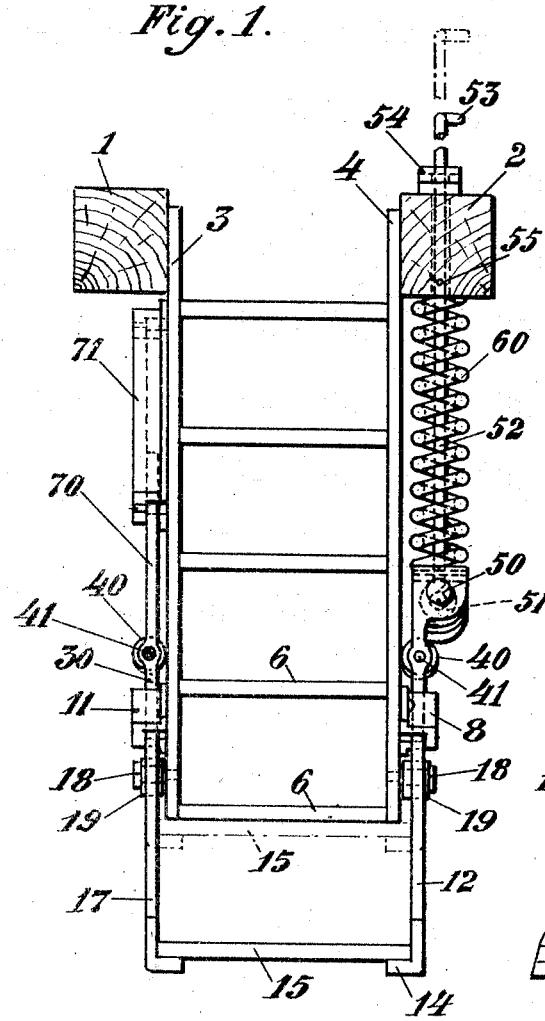
Figure 1, is a view in front elevation of a flight of car steps of standard construction with my improved device attached.
Figure 2:
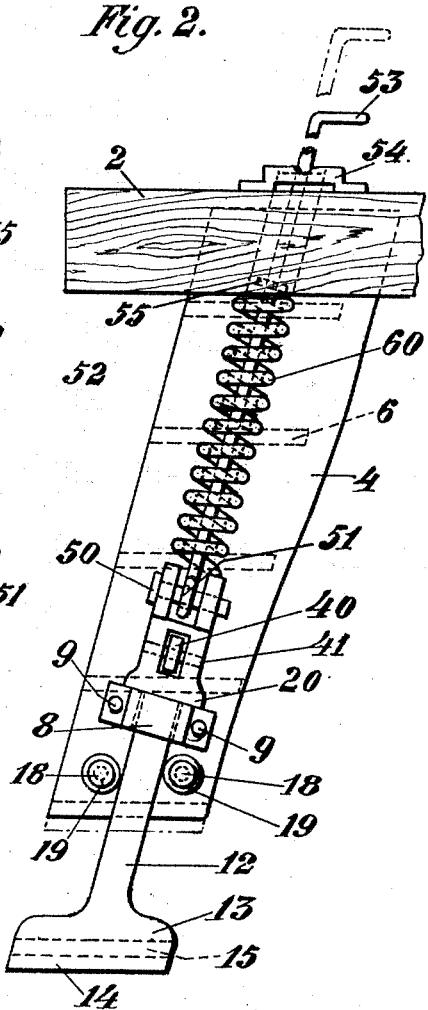
Fig. 2, is a view in side elevation of the same.

As shown in said drawings, 1 and 2 indicate the wooden sills of the car platform to which are attached depending stringers 3 and 4 between which are fastened five steps or treads 6, 6 constituting the car steps of standard construction.

Near the bottom end of the stringer 4, on the outside thereof, I have provided the guide 8 which is screwed to the stringer by the screws 9, 9 or fastened in any other suitable manner. In a similar position on the outside of the stringer 3, I have provided a similar guide 11. Adapted to slide through the guide member 8, is the flat bar 12 which is widened at its lower end as indicated at 13 and formed with an inwardly projecting flange 14 acting as a support for one end of the step or tread 15. Adapted to slide through the guide 11, is a similar bar 17 which similarly supports the other end of the step or tread 15. Below each of the brackets 8 and 11 and near the ends of the stringers 3 and 4 mounted on the pivots 18, 18, inserted in the stringers are provided two rollers 19, 19. These rollers are so located as to act as guides for the bars 12 and 17 as they are moved upwardly and downwardly through their respective brackets and hold the same in alinement. The bar 12 is enlarged as indicated at 20 near its upper end and such enlargement acts as a stop against the bracket 8 to limit the downward movement of the step 15. The bar 17 is similarly enlarged at 30. Above the enlargements 20 and 30, on the bars 12 and 17, are provided rollers 40, 40. The rollers 40, 40 are mounted in holes provided in the bars 12 and 17 and journaled on the pins 41, 41 the ends of which are fastened in bosses at the sides of the openings in the bars. The rollers 40, 40 are of a diameter slightly greater than the thickness of the bars 12 and 17 and are adapted to roll up and down the stringers 4 and 3 in order to lessen friction and facilitate the upward and downward movement of the step 15 as hereinafter explained.

Figure 3:
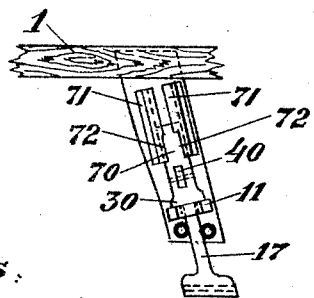
Fig. 3, is a view in side elevation of the same looking from the other side.

I have provided the following means for raising and lowering the step 15. The bar 12 is extended a slight distance above the roller 40, enlarged, bifurcated and provided with the transverse pin 50. The pin 50 is inserted through the eye 51 at the bottom end of the rod 52 which extends upwardly through a hole provided in the sill 2 and terminates in the end bent to form the handle 53. On top of the sill 2 is provided the plate 54 with a hole to accommodate the rod 52. Through the rod 52, at its end, near the handle 53, is provided a pin 55. The hole through the sill 2 is elongated in shape and is sufficiently large to permit the passage of the pin 55 therethrough. The plate 54, however, is provided with a small circular hole just large enough to permit the passage of the rod 52 and is further provided with radial slots 90 diametrically opposite each other extending from such hole, of sufficient size to permit the passage of the pin 55 when said pin lies in line with said slots. The upper surface of the plate 54 is further provided with two depressions 91 extending radially from the hole, arranged diametrically opposite each other; said depressions, however, lying in angular position with regard to the slots. The eye 51 on the rod 52 is sufficiently loose in order to permit a slight twisting of the rod. The pin 55 is so placed in the rod 52 that when the step 15 is in its uppermost position, lying just beneath the step 6, as indicated by the dotted lines in Fig. 1, said pin 55 will be just above the plate 54. The angular position of the pin 55 in the rod 52 is also such that as the rod 52 is drawn upward the pin 55 will go through the slot in the plate 54. When the rod 52 is drawn upward to its limit it may be slightly twisted, the eye 51 turning slightly on the pin 50 until the pin 55 lies above the depressions in the plate 54 when the rod 52 may be allowed to descend a short distance until the pin 55 lies in said depressions when the step 15 will accordingly be held in its topmost position. Below the bottom surface of the sill 2 and the upper end of the bar 12 is provided the helical compression spring 60 for the purpose of exerting a downward pressure on the said bar. The upper end of the bar 17 as shown in Fig. 3 is not bifurcated and provided with a pin but is extended upwardly to form the wide sliding member 70 adapted to engage with the slides 71, 71 mounted on the outside of the stringer 3. The slides 71, 71 on their inner edges at their lower ends are slightly cut away as indicated at 72, 72 in order not to offer an obstruction to the roller 40 in its upward movement.

Figure 4:
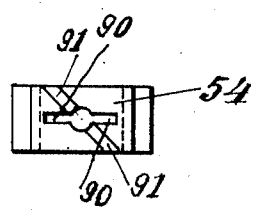
Fig. 4, is a top view of a part of the device.

Fig. 4, shows a top view of the plate 54. The radial slots through the plate 54 diametrically opposite each other extending from the hole in such plate are indicated by the numerals 90, 90. The two depressions extending radially from the hole arranged diametrically opposite each other, lying in angular position with regard to the slots are indicated by 91, 91. The slots 90, 90 permit the passage therethrough of the pin 55, and the depressions 91, 91 are for the purpose of accommodating the pin 55 in order to hold the step in its uppermost position as explained hereinbefore.

I claim as my invention:

1. In combination with a flight of car steps of standard construction, an extra step mounted at the lower end thereof, with means for raising and lowering said step, said means comprising two side rods slidably mounted on the stringers of the flight of steps, each of said rods carrying at its upper end a roller adapted to roll on the adjacent stringer, and a rod extending from the end of one of said side rods upwardly through the car platform sill with a handle on its upper end, carrying a helical spring adapted to be compressed between the lower surface of such sill and the upper end of said side rod as the extra step is raised.

2. In combination with a flight of car steps of standard construction, an extra step mounted at the lower end thereof, with means for raising and lowering said step, said means comprising two side rods slidably mounted on the stringers of the flight of steps lying between two rollers mounted on said stringers, each of said rods carrying at its upper end a roller adapted to roll on the adjacent stringer, and a rod extending from the end of one of said side rods upwardly through the car platform sill with a handle on its upper end, carrying a helical spring adapted to be compressed between the lower surface of such sill and the upper end of said side rod as the extra step is raised.

In witness whereof I have hereunto subscribed my name this 14th day of July, 1919.

LOUIS WARGA.